Figure 1:
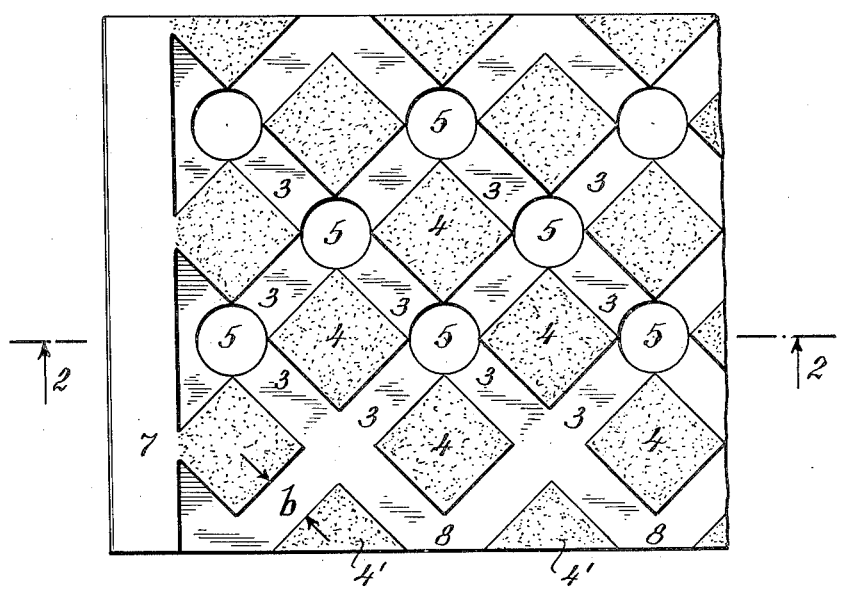

Sept. 29, 1936.   J. M. KLIPFEL   2,055,606
TREAD SURFACE
Filed July 15, 1935

John M. Klipfel
INVENTOR

BY
ATTORNEY

Patented Sept. 29, 1936

2,055,606

UNITED STATES PATENT OFFICE 2,055,606

TREAD SURFACE

John M. Klipfel, Elizabeth, N. J., assignor to Socony-Vacuum Oil Company, Incorporated, New York, N. Y., a corporation of New York Application July 15, 1935, Serial No. 31,494

7 Claims. (Cl. 20—78)

This invention relates to tread surfaces for floors, walkways, stairs and the like. It has particular reference to tread plates for such surfaces having a generally plane upper surface cut by grooves so proportioned and distributed as to render the remaining portions of the surface capable of frictionally engaging the shoe sole of the user through whatever grease or dirt may be present upon the face of the tread or sole.

This invention has for a principal object the provision of a tread surface so grooved that the remaining portions of the tread surface are so proportioned and positioned as to enable them to frictionally grip the shoe through adherent layers of dirt, grease, and the like. It has for a further object the proportioning and positioning of such grooves so that grease, dirt, and the like, accumulated therein will be compacted and forced by the normal contact of the user's feet to positions where it may fall from the tread or be easily removed therefrom. It has for an object the provision of spaced openings in such grooves through which the accumulated grease, dirt, and the like, so compacted and urged, may drop and be removed from the surface of the tread. It has for an object the provision of a tread having raised portions of such proportions that they will be sharp enough to grip, without being so sharp as to cause a stumbling hazard, and such that the proper degree of sharpness will be maintained throughout a long wearing life of the tread surface. It has for an object the provision of a grooved tread surface in which the grooves are so arranged that the surface may be cleaned easily by brushing or washing with a hose.

An important object is the provision of a tread surface of a characteristic visual appearance which will enable the edge of the tread, when it is used for stair treads and the like, to stand out and permit high visibility of the edge of the step. A further object is the provision of a design which will be in general free from tripping hazards near its edge when used as stair tread. An important object is the provision of a tread surface as described, in which the surface may be inlaid with abrasive material.

These and other objects of this invention are accomplished by the type of tread herein disclosed in a manner which will be more easily and completely understood by reference to the drawing attached to and made a part of this specification. In this drawing, Figure 1 is a plan view of the novel tread surface, and Figure 2 is a section through it, taken along the line 2—2.

Figure 2:
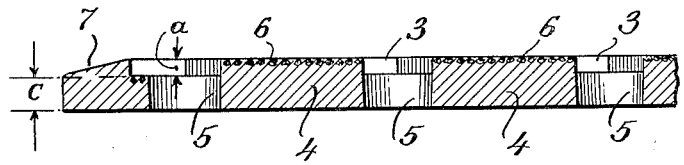

Referring now to Figure 1 of the drawing, the tread surface is seen in plan. The important features of this surface are the grooves 3, 3, intersecting at right angles, lying diagonally of the tread plate, and defined between the interlaced grooves a series of raised tablets or projections, 4, 4. At each intersection of the grooves, 3, 3, a hole 5 is pierced entirely through the plate. Turning to Figure 2, it will be noted that the wearing surface of each of the raised portions 4 is inlaid with grains of abrasive material, designated by 6.

Referring again to Figure 1, it is important to note that if the tread surface be applied to a stair tread, as shown, the working edge of the stair tread, that is, the edge of the long dimension, is provided with grooves 3 and projections 4 right up to the edge, the only changes in design being the provision of certain halved projection members 4' and the omission of the holes 5 at those points 8 where the intersections of grooves 3 occur at the edge of the tread. This construction may be followed if desired at the end of the tread, but it will be found preferable to finish the end with a raised surface 7, which may be bevelled as shown in Figure 2. This raised portion 7 offers a convenient space wherein bolt holes and the like for use in fastening the plate may be drilled without weakening the load bearing portions of the plate.

The arrangement of the grooves need not be at right angles, since they may be so disposed as to make the projecting areas diamond shaped instead of square. The important features of the tread surface, which enable it to accomplish the object intended are, however, dependent upon the positioning and proportioning of the grooves, projections, and holes in the manner shown for the following reasons. The grooves 3, 3 being so arranged that they are at an angle with the long dimension of the tread surface the raised projections 4, 4 will present their edges diagonally to the shoe sole when the tread is used in the normal manner. On a clean shoe, this will provide a frictional grip which is slight under non-slipping conditions, but will increase rapidly under the slightest condition of slip. On a dirty shoe, this diagonal presentation of the edge of raised projections 4, 4 will serve to remove much of the dirt with a shearing, slicing action and will enable the tread to firmly grip the shoe even through a considerable layer of dirt. Of course to accomplish this, the grooves must be not only of sufficient size to accommodate the removed dirt, but must be of such a design that they will not become clogged by it. Several things combine to accomplish this. The width of the grooves is such that the material in them is not entirely protected from contact with the shoe soles, which thus serve to compact it. The diagonal position of the groove with respect to the normal movement of the feet using the tread cause this contact not only to compact the dirt in the groove, but to cause it to move slightly along the groove. The provision of the holes 5 enables the dirt thus moved along the groove to drop therefrom. For successful operation, proportion is likewise important. The width of the groove, shown as "b" on Figure 1, should not be less than about ¼ of one inch, nor more than about ⅝ of one inch, ⅜ inch or ½ inch being the dimensions usually found best. The depth of the grooves indicated by "a" on Figure 2, preferably should not be less than about $\frac{3}{16}$", nor greater than about one-half of the width. The cross sectional shape of the groove may be rectangular, or with slightly sloped sides, or of semicircular or similar curved form as desired, except that in narrow grooves, the rectangular or nearly rectangular shape is to be preferred, since it gives a longer straight side to the raised surfaces 4, 4, and thus enables them to maintain a greater sharpness of edge during an equal portion of their wearing life. The diameter of the holes 5 should be somewhat greater than the width of the grooves 3 to enable the dirt from the grooves to drop through more easily. For example, with grooves ⅜" in width, it is preferable to use holes ½" in diameter. The spacing of the grooves may be varied, the chief consideration being to leave sufficient area in the flat raised projections 4, 4, so that the foot, especially in thin soled shoes will have the feel of contact with a flat surface rather than with a series of points. For example, with ⅜" width of grooves, it has been found preferable to space the grooves so that the projections 4, 4 measure ¾" along each side. The thickness of the tread plate below the bottom of the grooves, designated by "c" in Figure 2, is dependent upon the condition of service which the plate must meet, as strength in bending, and the like, and has no influence upon the design of the tread surface.

The provision of diagonal grooves of sufficiently great width and depth to give a well defined pattern or physical appearance to the surface of the tread plate is a safety factor of considerable importance. In the first place, regardless of size, the positioning of the grooves diagonally to the sides of the tread plates leads to a condition where the normal direction of travel will in general be diagonal to the grooves because the plates will be laid out with their long dimensions parallel to the course of travel. When the treads are used as stair treads, the different positions of subsequent treads in perspective will lead to a break in the pattern of diagonal lines at the edge of each step, thus defining the edge of the step even in rather dim lighting. With grooves disposed in any other manner, the visibility of the tread edge will not be so complete. For instance: With grooves parallel to the edge of the tread plate, it is almost impossible when descending stairs to accurately determine the edge of the tread. With a rectangular pattern of intersecting grooves parallel to and perpendicular to the edge of the tread, the visibility of the tread edge is likewise extremely poor. However, with the pattern disclosed herein, there is very little chance of the eye of the user remaining in a position where the pattern of succeeding steps is accurately superimposed so as to give the impression of a continuous surface. Assisting in this feature of greater visibility of edge of the tread when used for stair purposes is the fact that the holes 5 are not used in the intersections at the edge of the tread plate, and may, if desired, be omitted in the first row of intersections behind the edge. This will tend to give an opaque tread edge, which will be superimposed above a portion of the succeeding tread wherein the holes may be seen, and if the treads are used in the open, or in any conditions where light may penetrate through these holes from underneath, as is the usual case, this will also help to define the edge of the tread.

As an additional factor, this design of tread avoids depressions parallel to the edge or depressions near the edge of sufficient extent to permit the entry of the toe or heel portions of the bottom of shoes of normal size and thus tripping from these causes is minimized.

In the production of these treads, the abrasive may be placed in the surface by any of the usual methods common for accomplishing this result. For example, the mold may be prepared and after removal of the pattern the mold may be coated with adhesive and the abrasive sprinkled thereon, after which the adhesive may be suitably dried, the mold closed and the metal poured.

Many of the features of this new tread surface are free from limitations of dimensional proportion. Many depend somewhat upon the observance of certain proportions in design. The definite dimensions herein noted are given for exemplary and explanatory purposes only, and not with the intention of defining and limiting the invention thereby. That which is the invention herein presented is defined by the following claims, and the limitations to be placed thereon are the limitations expressed in those claims.

I claim:

1. A metallic tread plate the surface of which is divided by intersecting grooves into a plurality of flat-surfaced raised portions having rectilinear sides positioned at an angle to the edges of the plate, the width of the grooves being not less than ¼", the depth of the grooves being not less than half their width, and provided at a majority of the points of intersection of such grooves, with circular holes through said plate, the diameter of such holes being not less than the width of the grooves.

2. A metallic tread plate the surface of which comprises rectangular flat-surfaced raised portions, the sides of said raised portions being presented diagonally to the normal direction of travel over the tread, with resultant diagonal grooves or channels, the width of the grooves being such that the sole of a common shoe will be depressed thereinto to some extent, the depth of the groove being not greater than half the width, the area of the flat-surfaced portions being sufficiently great to give to the foot the impression of continuous flat surface, and at more than half of the points of intersection of the grooves, circular holes through the plate whose diameter is greater than the width of the grooves.

3. A metallic tread plate the surface of which is divided by intersecting grooves into a plurality of flat-surfaced raised portions having rectilinear sides positioned at an angle to the edges of the plate, the width of the grooves being not less than ¼", the depth of the grooves being not less than half their width, and provided at a majority of the points of intersection of such grooves, with circular holes through said plate, the diameter of such holes being not less than the width of the grooves, the surfaces of the flat-surfaced raised portions being inlaid with abrasive material deposited therein at the time of casting the tread plate.

4. A metallic tread plate having an abrasive upper wear surface formed of a plurality of rows of raised portions, and a surface spaced below the wear surface formed by the bottom walls of a plurality of relatively wide intersecting grooves which exist between the said raised portions, said grooves and the raised portions defining the same having substantially vertical side walls, the body of the plate being provided with openings extending through the plate from a plurality of the points of intersection of the grooves, said openings being of a diameter at least approximately the width of each respective groove.

5. A metallic tread plate having an abrasive upper wear surface formed of a plurality of diagonally arranged rows of flat rectangular raised portions, and a surface spaced below the wear surface formed by the bottom walls of a plurality of relatively wide intersecting grooves which exist between the said raised portions, said grooves and the raised portions defining the same having substantially vertical side walls, the body of the plate being provided with openings extending through the plate from a plurality of the points of intersection of the grooves, said openings being of a diameter greater than the width of each respective groove.

6. A metallic tread plate having an abrasive upper wear surface formed of a plurality of diagonally arranged rows of flat rectangular raised portions, and a surface spaced below the wear surface formed by the bottom walls of a plurality of relatively wide intersecting grooves which exist between the said raised portions, said grooves and the raised portions defining the same having substantially vertical side walls, the body of the plate being provided with openings extending through the plate from a plurality of the points where the grooves intersect near the longitudinal center of said plates while being free of openings adjacent its forward edge, said openings being of a diameter at least approximately the width of each respective groove.

7. A metallic tread plate having an abrasive upper wear surface formed of a plurality of rows of raised portions, and a surface spaced below the wear surface formed by the bottom walls of a plurality of relatively wide intersecting grooves, said grooves and the raised portions defining the same having substantially vertical side walls, there being openings through the plate at a plurality of the points of intersection of the grooves, said openings being of a diameter equal to the diagonal of the intersection of the grooves.

JOHN M. KLIPFEL.